US012239997B2

(12) United States Patent
Jaschek

(10) Patent No.: US 12,239,997 B2
(45) Date of Patent: Mar. 4, 2025

(54) MULTISTAGE SCREEN SORTING DEVICE

(71) Applicant: Voith Patent GmbH, Heidenheim (DE)

(72) Inventor: Thomas Jaschek, Bergatreute (DE)

(73) Assignee: Voith Patent GmbH, Heidenheim (DE)

(*) Notice: Subject to any disclaimer, the term of this patent is extended or adjusted under 35 U.S.C. 154(b) by 0 days.

(21) Appl. No.: 18/502,607

(22) Filed: Nov. 6, 2023

(65) Prior Publication Data

US 2024/0066527 A1 Feb. 29, 2024

Related U.S. Application Data

(63) Continuation of application No. PCT/EP2022/061895, filed on May 4, 2022.

(30) Foreign Application Priority Data

May 12, 2021 (DE) ..................... 10 2021 112 389.5

(51) Int. Cl.
*B03B 13/00* (2006.01)
*B03B 5/48* (2006.01)
*B08B 3/06* (2006.01)

(52) U.S. Cl.
CPC ................ *B03B 13/00* (2013.01); *B03B 5/48* (2013.01); *B08B 3/06* (2013.01)

(58) Field of Classification Search
CPC ........................................................ B08B 3/06
USPC ........................................................ 209/273
See application file for complete search history.

(56) References Cited

U.S. PATENT DOCUMENTS 5,609,729 A * 3/1997 Clarke-Pounder ....... D21C 7/12 162/380
2011/0077480 A1* 3/2011 Bloom .................. A61B 5/155 600/309

FOREIGN PATENT DOCUMENTS

| | | | | |
|---|---|---|---|---|
| DE | 19702044 C1 * | 4/1998 | | B01D 29/01 |
| DE | 19702043 A1 * | 7/1998 | | B01D 29/01 |
| EP | 1 245 724 A2 | 10/2002 | | |
| JP | 2017520310 A * | 6/2015 | | |
| KR | 10-2003-0010452 A | 2/2003 | | |
| WO | WO-2018202387 A1 * | 11/2018 | | G01F 23/0061 |
| WO | WO-2022238188 A1 * | 11/2022 | | B03B 13/00 |

OTHER PUBLICATIONS

Notification of the Transmission of the International Search Report and Written Opinion of the International Search Authority or Declaration dated Sep. 13, 2022 for International Application No. PCT/EP2022/061895 (11 pages).

* cited by examiner

*Primary Examiner* — Terrell H Matthews
(74) *Attorney, Agent, or Firm* — TAYLOR & EDELSTEIN

(57) ABSTRACT

A screen sorting device for cleaning a fibrous stock suspension includes: an inlet for the fibrous stock suspension; a first sorting stage, which includes a first accepts discharge; at least one second sorting stage, which includes a second accepts discharge; and a fill level detection way, which is configured for detecting an accumulation height in the at least one second sorting stage and is assigned to the at least one second sorting stage.

15 Claims, 2 Drawing Sheets

MULTISTAGE SCREEN SORTING DEVICE

CROSS REFERENCE TO RELATED APPLICATIONS

This is a continuation of PCT application no. PCT/EP2022/061895, entitled "MULTISTAGE SCREEN SORTING DEVICE", filed May 4, 2022, which is incorporated herein by reference. PCT application no. PCT/EP2022/061895 claims priority to German patent application publication no. 10 2021 112 389.5, filed May 12, 2021, which is incorporated herein by reference.

BACKGROUND OF THE INVENTION

1. Field of the Invention

The present invention relates to a multistage screen sorting device and to a method for cleaning a fibrous stock suspension.

2. Description of the Related Art

Screen sorting devices of this type are known, for example, under the designation Combisorter CSM and IntegraCombisorter. These screen sorting devices have a first horizontally arranged screen with disc rotor and a vertically arranged screen basket. A rotor arranged above a belt drive is provided radially inside the screen basket. An orifice plate is arranged between the horizontal screen and the screen basket. Contaminants and accepts are discharged in each screening stage. The advantage of Combisorters is their compact design. The disadvantage, however, is that the efficiency of screen sorting devices depends on the supply of fibrous stock suspension and the contaminant content in the fibrous stock suspension, and, in the case of Combisorters, due to their design, depends on the quality of the fibrous stock suspension and on the volume of fibrous stock suspension fed into the first sorting stage. Contaminants such as plastic parts can for example be pulverized due to a long dwell time, especially in the first sorting stage through the action of the rotor, and thus enter the accepted stock as micro particles.

A device for cleaning a fibrous stock suspension is known from DE 197 02 043 C2. This device is used to clean fibrous stock suspensions that are rich in clumps and have a high proportion of heavy dirt. For extraction of heavy dirt, a vortex separator is provided below the inlet of the fibrous stock suspension. The heavy dirt can thus be discharged downwards via this vortex separator. A centrifugal separator is arranged above the fibrous stock suspension inlet. Accepts that have passed through the screen are removed via an accepts discharge system. A deflaking station with a screen disc is arranged above the centrifugal separator. The fibrous stream passing through this screen disc is fed to a further accepts discharge. The rejects of the deflaking station can be fed to the vortex separator.

The vortex separator, centrifugal separator and deflaking station are connected directly in series. This results in a compact design. It is disadvantageous that the individual contents of contaminants can fluctuate in fibrous stock suspensions. As a result, individual separators or stations may be overloaded with rejects or may not operate optimally due to an insufficient amount of inflowing fibrous stock suspension.

A pressure screen for removing contaminants is known from EP 1 245 724 A2, wherein the pressure sorter has screens connected in series and the accepts are fed into the second screen following the first screen as fibrous stock inflow. Here, too, the screens are arranged one above the other, and the feed into the second screen basket depends on the amount of accepts coming from the first screen basket. Thus, the fibrous stock inflow into the second screen stage varies depending on the pulp quality in the Combisorter. If the volume of contaminants is too high, clogging can occur. If the accepts content in the respective stage is rather high, and fibrous stock suspension admission is high, some of the accepts present in the suspension will be discharged with the contaminants.

What is needed in the art is to optimize the efficiency of the subsequent cleaning stage in a compact multi-stage screen sorting device for cleaning a fibrous stock suspension.

SUMMARY OF THE INVENTION

The present invention provides a screen sorting device for cleaning a fibrous stock suspension, having an inlet for fibrous stock suspension and having a first sorting stage and at least one second sorting stage, wherein the first sorting stage has a first accepts discharge, and the second sorting stage has a second accepts discharge, characterized in that a fill level detection ways for detecting an accumulation height in the second sorting stage is assigned to the second sorting stage. By way of providing a fill level detection at the second sorting stage, it is possible to optimize the screen sorting device during operation. As previously described, the efficiency of a sorting stage depends on the fill level. Thus, by changing the feed into the screen sorting device, the efficiency of the second sorting stage can be increased. Changes in the composition of the incoming fibrous stock suspension can be taken into account.

If, for example, the heavy stock content has increased, the accumulation height can be adjusted by increasing the pressure at the inlet of the supplied fibrous stock suspension.

Overflow of the second sorting stage can also be prevented by fill level detection. Overflow is understood to mean the discharge of fibrous stock suspension with stock consistencies clearly less than 15% weight percent through a reject overflow of the second sorting stage.

In one embodiment, a pressure detection is provided for detecting the prevailing pressure on the side of the orifice plate facing the second sorting stage. This allows the accumulation height to be determined by a pressure sensor. Such a fill level detection system can be implemented at low cost.

In order to counteract contamination of the pressure sensor, it has proved advantageous to arrange the pressure sensor at a location around which rinsing water is flushed to dilute the fibrous stock suspension in the second sorting stage. This counteracts contamination of the pressure sensor. Contamination of the pressure sensor could result in incorrect accumulation heights.

In an optional embodiment, the rinsing water inlet is provided with a pressure sensor. This arrangement is located in a supply line and does not have to be provided inside the housing of the screen sorting device. Thus, this solution is constructively cost-effective. The sensor can also be provided in the connecting flange of the screen sorting device or can also be inserted into the supply line by way of a T-piece. This pressure sensor is considered to be associated with the screen sorting device.

It has proven advantageous that, as the pressure sensor, a sensor is provided which can also detect negative pressures. This allows the accumulation height to be determined reliably with high accuracy in the event of negative pressure in the rinsing water supply line. It is possible to eliminate the dynamic pressures due to the flow velocity in the rinsing water supply line.

Pressure sensors that are capable of detecting pressures in the range from −0.5 bar to +0.5 bar, optionally with an accuracy of less than 0.2%, have proven to be particularly suitable.

In some applications, fill level detection by way of temperature acquisition has proved to be particularly suitable. Acquisition of the housing temperature is easily implemented in terms of design. Fill level detection by temperature acquisition in an application where the temperature of the fibrous stock suspension deviates significantly from the ambient temperature is reliable and possible by simple ways. For example, by acquisition of the temperature profile of the housing of the second screening stage, it is possible to infer the accumulation height of the fibrous stock suspension. The temperature sensor can be integrated into the housing or can be provided outside the housing—for example by detecting the housing temperature by way of an IR sensor.

In one embodiment of a fill level detection by way of a temperature sensor, there is a provision to cool a part of the housing. This makes it possible to reliably determine the accumulation height via temperature measurement independently of the ambient temperature and independently of the temperature of the fibrous stock suspension. In some applications, it is also possible to implement cooling only periodically to increase the measurement accuracy.

In one embodiment of a fill level detection system, a capacitive sensor is provided. Fill level detection is easy through an area of the housing with a non-ferromagnetic material. For example, a viewing window consisting of a plastic material can be used for measurement. Alternatively, an optical acquisition of the fill level can be provided by way of an optical sensor.

The method according to the present invention is characterized by consideration of the accumulation height determined by way of fill level detection during operation of the screen sorting device. The process dynamically accounts for changes in the supplied fibrous stock suspension. As a result, increased efficiency can be achieved.

It has proven advantageous to store a target fill level in the control system and, in the event of a deviation from the target accumulation height exceeding a predetermined deviation—or also referred to as target fill level—to adjust the fibrous stock suspension feed incrementally for an adjustment of the target fill level.

It has proven to be advantageous for an improved acquisition of the accumulation height in a fill level detection by way of a pressure acquisition in the inflowing rinsing water that the dynamic pressure component associated with the inflow volume of the rinsing water is determined and this pressure component is taken into account in determining the accumulation height.

An improved method provides that the pulsating pressure signals are smoothed when the level is determined. This increases the accuracy of the measurement. The smoothing can be performed in the control system or already by the pressure sensor used.

In an optional embodiment, it is provided that the sorting stages of the screen sorting device are provided in a common housing. This makes the screen sorting device particularly compact. However, the inflow of fibrous stock suspension from the first to the second sorting stage is also provided directly, without a pump or valve being provided in between. Therefore, the fill level detection is of great benefit in order to also efficiently utilize the second stage. For beneficial utilization of the second stage, it must be ensured that a minimum proportion of fibrous stock suspension is supplied to flow through the second stage.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
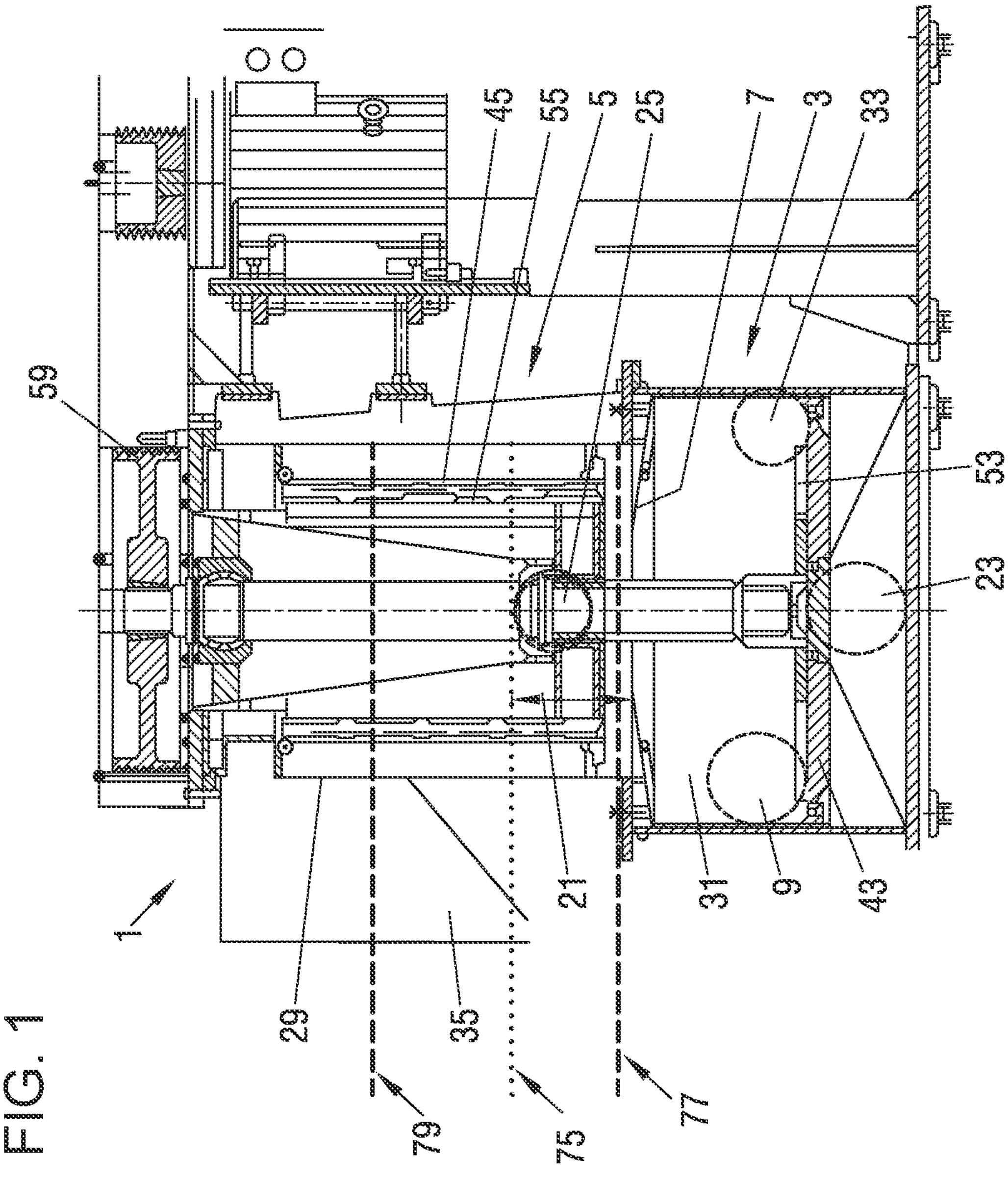
FIG. 1 is a schematic representation of a screen sorting device according to the present invention.

First, a screen sorting device 1 according to the present invention is described with reference to FIG. 1. A fibrous stock suspension is fed tangentially into first sorting stage 3 through an inlet 9 above a first screen designed as a disc screen 43. Contaminants are retained at disc screen 43. The portion of the suspension already cleaned here passes through disc screen 43 into first accepts chamber 13 and exits sorting device 1 via first accepts discharge 23. A control valve can be provided in the accepts discharge to limit the discharge volume, thereby increasing the portion of fibrous suspension into the second sorting stage.

Heavy dirt discharge 33 is located above disc screen 43. The heavy dirt is discharged either via a conical centrifuge or via a periodically operating pneumatic gate valve. In this way, heavy dirt accumulation and thus extreme wear on screen sorting device 1 is prevented. Disc screen 43 is kept free by the disc rotor as the first rotor 53 of first sorting stage 3. Said disc rotor, together with the webs welded onto disc screen 43, provides a deflaking effect in the suspension. Inlet chamber 31 is limited at the top by an orifice plate 7, which has an opening in the center. Due to the tangential inflow and rotor rotation a vortex flow is created. Specifically lighter components than the suspension pass through orifice 7 in the center of the vortex into the washout and dewatering zone of second sorting stage 5.

The operating principle of this screen sorting device with the at least two sorting stages—sorting stages herein refer to screen sorting stages—is based on the utilization of the radial pressure gradient in the vortex flow: Screen sorting device 1 operates in the disk part of first sorting stage 3 with overpressure and thus achieves a relatively high throughput. In the cylindrical part in second sorting stage 5, the transport and dewatering elements of second rotor 55 in the embodiment of a cylindrical rotor carry out a pressureless, continuous washing out of the fibrous stock suspension entering this sorting stage. At the same time, dewatering of the contaminants, referred to as reject material takes place. This second sorting stage, also referred to as the washout and dewatering zone, consists of a cylindrical screen basket 45 and a cylindrical rotor 53. Dilution water, also referred to as rinsing water, is introduced below screen basket 43 via rinsing water inlet 17. Dilution water and any fibers still present exit through screen basket 45 and leave screen sorting device 1 via second accepts discharge 25. Any contaminants still present are retained by screen basket 45 and conveyed upwards by cylindrical rotor 55. They leave the screen sorting device as a discharge with a high dry content via reject overflow 35.

The following applies to the setting of accumulation height 21, which is set above orifice plate 7 on upper screen basket 45:

If it is too low, the contaminants will not reach the upper part of screen sorting device 1 and no rejects—also referred to as contaminants—will be discharged. In particular, a pulverization of contaminants can occur in the first sorting stage. These pulverized contaminants then enter the first accepts chamber and represent a deterioration of the fibrous stock suspension obtained as accepts.

If it is too high, fiber losses increase, and overflow can occur.

An accumulation height in a central area of the screen basket 45 is ideal. Accumulation height 21 can also be viewed and adjusted via the installed inspection window, which is not shown. An accumulation height up to half the height of the inspection window has proven to be effective. The area between the screen basket and the housing should not be flooded by the accepts. Filling this gap between the screen basket and the housing to above the upper edge of the accepts discharge is considered to be flooding.

The inspection window provides a partial view of upper screen basket 45, where accumulation height 21 can be determined via the outflowing accepts. This is usually adjusted by adjusting the inlet pressure in 0.05 bar increments until the screen sorting device discharges accepts with the smallest possible contaminant content and contaminants as "fiber-free" as possible during reject overflow. Rejects discharged at the reject overflow have a fiber contents of only 10 to 15% weight percent maximum.

The pressure drop across the disc screen and the dynamic pressure required for contaminant discharge depend on the stock consistency and contaminant load. If the stock consistency and/or the contaminant content changes, the throughput of screen sorting device 1 changes and so does the required dynamic pressure for contaminant discharge. Therefore, screen sorting device 1 is highly dependent on external influences and must be regularly monitored and readjusted.

If operation settles below low fill level 77 in order not to "lose" fibers, wear in screen sorting device 1 itself increases as a result. Downstream systems are subjected to increased contaminant contents due to the accepts being discharged from the screen sorting device. This leads to problems, especially in the final stages of fine screening. In general, an increased sticky and contaminant load can also occur, since the contaminants, especially in first sorting stage 3, are ground small and fed forward as accepts.

Figure 2:
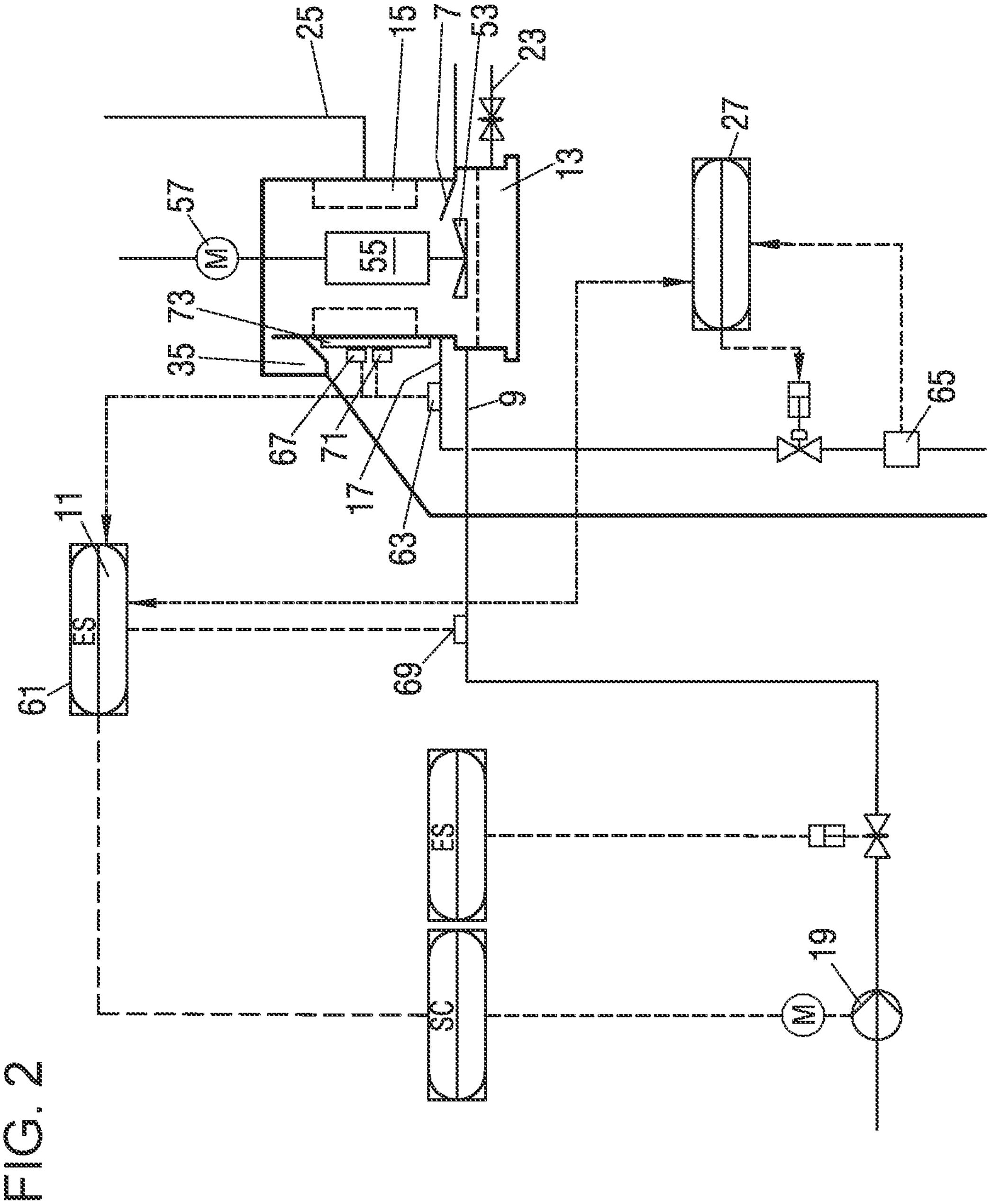
FIG. 2 is a schematic representation of the screen sorting device according to the present invention in a possible operational integration.

Therefore, use of a fill level detection system 11 is provided. Fill level detection 11 makes it possible to permanently detect the fill level in sorting stage 5 and to readjust it if necessary. This ensures that a predetermined level stored in control system 61 is permanently maintained in the second sorting stage, in particular at upper screen basket 45. Desired fill levels 75 which depend on additional parameters, such as the stock consistency of the supplied fibrous stock suspension, can also be stored in control unit 61 (FIG. 2). Since the quality of the fibrous stock suspension supplied via the inlet will fluctuate to a small extent, a fluctuation of the fill level will occur. A fill level between maximum permissible height 79, referred to as high fill level, and minimum height 77, referred to as low fill level, is permissible. Maximum height 79 is at the level of the top edge of the inspection window. Minimum fill level 77 is at the height of the lower edge of the inspection window. A fill level that is considered too low is below low fill level 77, and a fill level that is considered too high is above high fill level 79, shown as an example in FIG. 1.

A fill level detection 11 can be realized in different ways. The following three possibilities are explained in more detail below:

1. Pressure measurement above the orifice plate, direct detection;
2. Heat detection of the housing, indirect detection;
3. Capacitive detection of the splash water, indirect detection.

Pressure Measurement:

The simple possibility is a pressure measurement above orifice plate 7. This measurement is then purged of influences from inlet chamber 31. A measurement in feed line 9 of the fibrous stock suspension or in inlet chamber 31 has proven to be unsuitable due to the high dynamics within screen sorting device 1.

Since deposits can form above orifice plate 7 and these deposits can make pressure measurement difficult, the pressure can be recorded, i.e. at the rinsing water nozzle and in the supply line by way of a pressure sensor 63 without the risk of the measured values being dissipated by deposits. At this point, water is added permanently during operation, thus flushing the nozzle. However, care must be taken here to ensure that the dynamic pressure is accounted for. The dynamic component can be compensated via the height equation (Bernulli) and the existing value of the FIC (Flow Indication Control) reference 27.

Depending on detected accumulation height 21, control unit 61 can regulate the pressure during infeed of the fibrous stock suspension. Pump 19 which is controlled by control unit 61 is provided for feeding the fibrous stock suspension. Pressure sensor 69 is provided in the infeed to inlet 9 of the fibrous stock suspension, so that the infeed of the fibrous stock suspension can be adjusted, in this case pressure-controlled, as a function of the respectively detected accumulation height.

Temperature Detection:

Another possibility for fill level detection is by way of temperature detection. It has been shown that the accumulation height, also referred to as fill level, can be inferred by "hand contact". The temperature of housing 29 in the area of second sorting stage 5 can be used as an indirect detection of the accumulation height. The rotor pushes the accepts through the second screen, the accepts then splash against the wall of housing 29, run down the wall and are discharged via second accepts discharge 25. For determination of the accumulation height by way of temperature detection, it is also necessary to detect the temperature of the fibrous stock suspension in order to use the temperature of the fibrous stock suspension as a reference temperature.

If the ambient temperature is close to the reference temperature, and if for example, the temperature difference between the reference temperature and the ambient temperature is less than 5° C., external cooling is required to be able to reliably detect the accumulation height. For example, one of the fins of the housing wall can be cooled using cool service water as cooling.

The temperature profile of the housing in the region of second sorting stage 5 is the basis for the determination of the accumulation height by way of temperature acquisition. An IR-sensor may for example be utilized as temperature sensor 71 for this purpose.

Capacitive Detection:

Similarly, material splashing against the wall can be detected using a capacitive or comparable method. For this purpose, a portion of housing 29 is replaced with non-magnetic material, such as an acrylic inspection window. This method is particularly suitable in the case of aqueous accepts, wherein the accepts run off the inner wall of the housing due to their consistency.

COMPONENT IDENTIFICATION LISTING

1 Screen sorting device
3 1st sorting stage
5 2nd sorting stage
7 Orifice plate
9 Fibrous stock suspension inlet
11 Fill level detection
13 1st accepts chamber
15 2nd accepts chamber
17 Rinsing water inlet
19 Pump for fibrous suspension
21 Accumulation height
23 1st accepts discharge
25 2nd accepts discharge
27 Rinsing water control
29 Housing
31 Inlet chamber
33 Heavy material discharge
35 Reject overflow
37 Lower support
43 1st screen/disc screen
45 2nd screen/screen basket
53 1st rotor
55 2nd rotor
57 Rotor drive
59 Belt drive
61 Control system
63 Pressure sensor for rinsing water inlet
65 Rinsing water flow rate sensor
67 Capacitive sensor
69 Pressure sensor suspension inlet
71 Temperature sensor
73 Cooling
75 Target fill level
77 Low fill level
79 High fill level While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A screen sorting device for cleaning a fibrous stock suspension, the screen sorting device comprising:
an inlet for the fibrous stock suspension;
a first sorting stage, which includes a first accepts discharge;
at least one second sorting stage, which includes a second accepts discharge;
a fill level detector, which is configured for detecting an accumulation height in the at least one second sorting stage and is assigned to the at least one second sorting stage; and
an orifice plate, which is arranged between the first sorting stage and the at least one second sorting stage and includes a side facing the at least one second sorting stage, wherein the screen sorting device is configured such that a pressure acquisition for a detection of a prevailing pressure is provided on the side of the orifice plate facing the at least one second sorting stage.

2. A screen sorting device for cleaning a fibrous stock suspension, the screen sorting device comprising:
an inlet for the fibrous stock suspension;
a first sorting stage, which includes a first accepts discharge;
at least one second sorting stage, which includes a second accepts discharge;
a fill level detector, which is configured for detecting an accumulation height in the at least one second sorting stage and is assigned to the at least one second sorting stage; and
a rinsing water inlet; and
a screen, wherein the rinsing water inlet is provided for an inflow of a rinsing water for diluting the fibrous stock suspension entering the screen, wherein the rinsing water inlet includes a pressure sensor.

3. The screen sorting device according to claim 2, wherein the pressure sensor is configured for detecting a plurality of negative pressures.

4. The screen sorting device according to claim 2, wherein the pressure sensor is configured for detecting a plurality of pressures in a range of −0.5 bar to 0.5 bar.

5. The screen sorting device according to claim 2, wherein the pressure sensor has a measuring accuracy of at least less than 0.2%.

6. The screen sorting device according to claim 1, further comprising a housing and a temperature sensor configured for detecting a temperature profile, the first sorting stage and the at least one second sorting stage being arranged in the housing, wherein for the fill level detector the temperature sensor configured for detecting a temperature profile is assigned to the at least one second sorting stage.

7. The screen sorting device according to claim 6, wherein the temperature sensor is configured for two-dimensional detection of a temperature distribution of the housing surrounding the at least one second sorting stage.

8. The screen sorting device according to claim 6, wherein the temperature sensor is provided inside the housing or integrated in the housing.

9. The screen sorting device according to claim 6, wherein the at least one second sorting stage includes a cooling system for at least partially cooling the housing which surrounds the at least one second sorting stage.

10. The screen sorting device according to claim 6, wherein at least a partial region of housing surrounding the at least one second sorting stage consists of a non-ferromagnetic material, wherein the fill level detector includes a capacitive sensor.

11. The screen sorting device according to claim 1, further comprising a common housing, wherein the first sorting stage and the at least one second sorting stage are arranged in the common housing, wherein at least the first sorting stage is a screen sorting stage.

12. The screen sorting device according to claim 11, wherein the at least one second sorting stage is a screen sorting stage.

13. A method for operating a screen sorting device for cleaning a fibrous stock suspension, the method comprising the steps of:

providing that the screen sorting device includes:

an inlet for the fibrous stock suspension;

a first sorting stage, which includes a first accepts discharge;

at least one second sorting stage, which includes a second accepts discharge; and a fill level detector, which is configured for detecting an accumulation height in the at least one second sorting stage and is assigned to the at least one second sorting stage;

assigning a control unit to the screen sorting device;

controlling a supply of the fibrous stock suspension into the screen sorting device by the control unit;

feeding data of a sensor assigned to the at least one second sorting stage to the control unit for the fill level detector;

storing a desired fill level in the control unit and, in an event of a detected fill level falling below the desired fill level, increasing at least one of an inflow volume and an inflow pressure of the fibrous stock suspension entering the screen sorting device; and reducing, in an event of a detected high fill level exceeding the desired fill level which is stored, an inflow of the fibrous stock suspension that is incoming.

14. The method according to claim 13, wherein, during a fill level detection, a dynamic pressure component associated with an inflow volume of a rinsing water is determined by way of a pressure detection in the rinsing water that is inflowing, and the dynamic pressure component is taken into account in determining the accumulation height.

15. The method according to claim 13, wherein, during determination of the fill level for eliminating a pulsating signal due to a rotation of an at least one rotor of the screen sorting device, a smoothing of a plurality of signals is carried out.

* * * * *